United States Patent
Zhu et al.

(10) Patent No.: US 11,692,865 B1
(45) Date of Patent: Jul. 4, 2023

(54) CONTINUOUS WEIGHING SYSTEM FOR SMALL PRODUCTS AND WEIGHING METHOD THEREOF

(71) Applicant: Shanghai Quntin-Tech Co., Ltd., Shanghai (CN)

(72) Inventors: Weiqun Zhu, Shanghai (CN); Hongbao Yang, Shanghai (CN)

(73) Assignee: SHANGHAI QUNTIN-TECH CO., LTD., Shanghai (CN)

( * ) Notice: Subject to any disclaimer, the term of this patent is extended or adjusted under 35 U.S.C. 154(b) by 0 days.

(21) Appl. No.: 18/016,280

(22) PCT Filed: Jun. 7, 2022

(86) PCT No.: PCT/CN2022/097369
§ 371 (c)(1),
(2) Date: Jan. 13, 2023

(87) PCT Pub. No.: WO2023/273809
PCT Pub. Date: Jan. 5, 2023

(30) Foreign Application Priority Data

Jun. 30, 2021 (CN) .......................... 202110734525.8

(51) Int. Cl.
*G01G 13/02* (2006.01)
*G01G 15/00* (2006.01)
(Continued)

(52) U.S. Cl.
CPC .............. *G01G 21/22* (2013.01); *A61J 3/074* (2013.01); *B07C 5/18* (2013.01); *G01G 13/02* (2013.01);
(Continued)

(58) Field of Classification Search
CPC ......... A61J 3/074; A61J 2200/74; B07C 5/18; B07C 2501/0081; G01G 13/02; G01G 15/00; G01G 17/00; G01G 21/22
See application file for complete search history.

(56) References Cited

U.S. PATENT DOCUMENTS

| 6,114,636 | A | * | 9/2000 | Cane' | ............... G01G 17/00 209/592 |
| 6,162,998 | A | * | 12/2000 | Wurst | ............... G01G 17/00 221/277 |
| 8,350,164 | B2 | * | 1/2013 | Wang | ............... G01G 17/00 177/116 |

FOREIGN PATENT DOCUMENTS

| CN | 111174879 A | 5/2020 |
| CN | 111238207 A | 6/2020 |

(Continued)

OTHER PUBLICATIONS

International Search Report in corresponding International Application No. PCT/CN2022/097369, dated Aug. 23, 2022; 6 pgs.
(Continued)

*Primary Examiner* — Randy W Gibson
(74) *Attorney, Agent, or Firm* — Hauptman Ham, LLP

(57) ABSTRACT

A weighing system is mounted on a support, and the support is configured to support the weighing system. The weighing system includes a feeding mechanism, a conveying and transferring mechanism, pushing rods, a pushing mechanism, resetting mechanisms, a weighing mechanism, and a linkage follower mechanism. The feeding mechanism is arranged at a top portion of the support. The conveying and transferring mechanism is arranged below the feeding mechanism. The conveying and transferring mechanism includes a transferring wheel, a plurality of first channels, a plurality of sliding blocks, a plurality of first grooves and a guide base. The pushing mechanism is arranged on one side
(Continued)

of the transferring wheel. The resetting mechanisms are configured to push the sliding blocks connected with the pushing rods to slide along the first channel towards an initial direction, and the weighing mechanism is arranged below the transferring wheel.

10 Claims, 8 Drawing Sheets

(51) Int. Cl.
  *G01G 17/00* (2006.01)
  *G01G 21/22* (2006.01)
  *A61J 3/07* (2006.01)
  *B07C 5/18* (2006.01)

(52) U.S. Cl.
  CPC ... *A61J 2200/74* (2013.01); *B07C 2501/0081* (2013.01); *G01G 15/00* (2013.01); *G01G 17/00* (2013.01)

(56) References Cited

FOREIGN PATENT DOCUMENTS

| CN | 113320949 A | 8/2021 |
| EP | 0685714 A1 | 12/1995 |
| EP | 1671903 A1 | 6/2006 |

OTHER PUBLICATIONS

Written Opinion in corresponding International Application No. PCT/CN2022/097369, dated Aug. 23, 2022; 10 pgs.

* cited by examiner

CONTINUOUS WEIGHING SYSTEM FOR SMALL PRODUCTS AND WEIGHING METHOD THEREOF

RELATED APPLICATIONS

The present application is a U.S. National Phase of International Application Number PCT/CN2022/097369 filed Jun. 7, 2022, and claims priority to Chinese Application Number 202110734525.8 filed Jun. 30, 2021.

TECHNICAL FIELD

The present disclosure belongs to the technical field of pharmacy, food, chemicals and manufacturing technology, in particular to a continuous weighing system for small products and a weighing method thereof.

BACKGROUND

At present, there are mainly two continuous weighing mechanisms around the world. The first mechanism is that: when the capsule is pushed into the corresponding groove on the transferring wheel from the feeding tube, the width of the groove is smaller than the outer diameter of the capsule, so that the capsule is clamped in the groove without falling; when the groove is rotated to the top of the weighing platform, the capsule is pulled out of the groove by the fork and dropped into the weighing platform to weigh the capsule. In such a transferring mode, a risk of damage and powder leakage exists when the capsule is squeezed. In addition, in case of large deformation of the capsule, the capsule may not be clamped by the groove, and the capsule may be fallen off the table before weighing.

The second mechanism is that: the capsule is entered into the guide channel from the feeding tube and is fallen on the front teeth of the rotating transferring plate which matches the guide channel, the capsule is slid down to the weighing platform along the guide channel along with the front teeth of the transferring plate, and then is stopped under the action of the gravity, since the tooth spacing between two adjacent teeth on the transferring plate is greater than the length of the weighed capsule, during a duration when the front teeth of the transferring plate leave the front end of the capsule to the rear teeth of the transferring plate pressed against the rear end of the capsule, the capsule is stayed on the weighing platform to complete weighing, and subsequently the capsule is pushed away from the weighing platform by the rear teeth of the transferring plate to complete a weighing cycle. When the rotating speed of the transferring plate is larger than the sliding speed of the capsule, the rear end of the capsule is directly pushed into the weighing platform by the rear teeth of the transferring plate, the capsule is weighed in the process of being pushed by the rear teeth of the transferring plate, and therefore, the weighing result is currently inaccurate. When the rotating speed of the transferring plate is lower than a certain value, the capsule will be slowed down or even stopped, and is disengaged from the front teeth on the transferring wheel and pushed into the weighing platform by the rear teeth in the case where the inertial force of the capsule is less than the friction resistance during the process that the capsule enters the weighing platform at the lowest outlet of the guide channel, in such a way, the capsule is also weighed in the process of being pushed by the rear teeth of the transferring plate as in the previous case, and therefore the weighing result is not accurate either. Within a range varying at a normal weighing speed, the front and rear positions where the capsules are fallen on the weighing platform may also be inconsistent, and therefore, the weighing accuracy will be affected when the selected weighing duration is unreasonable.

SUMMARY

The present disclosure provides a continuous weighing system for small products and a method thereof, which solves the above problems and realizes the rapidly continuous weighing for small products.

The technical solutions adopted by the present disclosure to solve the technical problems are as follows. Provided is a continuous weighing system for small products, the system comprises a support, a feeding mechanism, a conveying and transferring mechanism, a plurality of pushing rods, a pushing mechanism, a plurality of resetting mechanisms, a weighing mechanism, a discharging channel, and a linkage follower mechanism.

The feeding mechanism is arranged at a top portion of a support, and the feeding mechanism is configured to convey the plurality of small products to the conveying and transferring mechanism in a single row mode.

The conveying and transferring mechanism is arranged below the feeding mechanism, and the conveying and transferring mechanism is configured to convey the plurality of small products to the weighing mechanism one by one.

The conveying and transferring mechanism includes a transferring wheel, a plurality of first channels, a plurality of sliding blocks, a plurality of first grooves and a guide base, the transferring wheel is arranged below the feeding mechanism, the plurality of first channels are arranged on an outer circumferential surface of the transferring wheel at an equal interval along an axial direction, the sliding blocks are arranged inside the first channels, the plurality of first grooves are arranged on the outer circumferential surface of the transferring wheel between each two adjacent first channels at an equal interval along an axial direction, the guide base is closely proximate to a part of the outer circumferential surface of the transferring wheel.

Each of the pushing rods is arranged at one end of a respective one of the sliding blocks along an axial direction of the respective one of the sliding blocks.

The pushing mechanism is arranged on one side of the transferring wheel, and the pushing mechanism and the pushing rods are located at the same side of the transferring wheel, and the pushing mechanism is configured to push the sliding blocks connected with the pushing rods to slide along the first channels in a direction away from the pushing mechanism.

The resetting mechanisms are configured to push the sliding blocks connected with the pushing rods to slide along the first channels towards an initial position.

The weighing mechanism is arranged below the transferring wheel and fixed on the support, and the weighing mechanism is configured to weigh the small products one by one.

The discharging channel is arranged below one side of the weighing mechanism away from the guide base, and the discharging channel is configured to discharge the weighed small products.

The linkage follower mechanism is arranged above the discharging channel, and the linkage follower mechanism is configured to prevent the small products from slipping from the weighing mechanism to an external environment caused by a function of inertia.

Preferably in the present disclosure, each of the first grooves includes a limiting portion, a first slope, a second slope and a channel section. The channel section, the first slope, the limiting portion and the second slope are sequentially arranged at a bottom portion of each of the first grooves along a rotation direction of the transferring wheel. The limiting portion is formed by concaving an intersection of the first slope and the second slope along a direction of a middle portion of the transferring wheel. The first slope, the limiting portion and the second slope are in a V-shaped structure, and a bottom surface of the channel section is concentric with and equidistant from an outer circle of the transferring wheel.

Preferably in the present disclosure, the linkage follower mechanism includes a cam structure, a swing shaft, a fixation frame, a roller, a swing arm and a plurality of gear levers. The cam structure is arranged along an outer circumferential surface of the transferring wheel to form a circular structure. The swing shaft is arranged above the discharging channel along an axial direction of the transferring wheel. The fixation frame is arranged on both sides of the discharging channel and is connected to both ends of the swing shaft. The swing arm is arranged above the swing shaft. The roller is arranged on a top portion of the swing arm and is tangent to the circular structure formed by the cam structure. The plurality of gear levers are distributed at an equal interval on one side of the swing shaft facing the transferring wheel, and each gear lever is aligned with an outlet direction of the weighing mechanism respectively.

Preferably in the present disclosure, the plurality of sliding blocks are reciprocally slid along an axial direction of the first channels.

Preferably in the present disclosure, the plurality of sliding blocks are reciprocally slid along an radial direction of the first channels.

Preferably in the present disclosure, the system further includes a plurality of second grooves, and the plurality of the second grooves are arranged at an equal interval on one side of the sliding blocks facing the external environment, a distance between each two adjacent second grooves is consistent with a distance between each two adjacent first grooves.

Preferably in the present disclosure, the pushing mechanism includes a first cam and a first pushing portion. The first pushing portion is formed by a part of the first cam extending in a direction of the transferring wheel from one side facing the transferring wheel.

Preferably in the present disclosure, the pushing mechanism includes a second cam and a second pushing portion. The second pushing portion is formed by a part protruding upward from a top surface of the second cam.

Provided is further a weighing method for the continuous weighing system for small products. The method includes the following steps.

In Step 1, small products are fed, that is, the plurality of small products are conveyed by a feeding mechanism into first grooves in a transferring wheel in a single row mode.

In Step 2, the small products are conveyed, that is, the plurality of small products are conveyed to a weighing mechanism one by one by a conveying and transferring mechanism.

In Step 2-1, with a rotation of the transferring wheel, one of the pushing rods reaching a first cam is moved along one side of the first cam facing the transferring wheel.

In Step 2-2, with the rotation of the transferring wheel, one of the pushing rods reaching a first pushing portion is gradually moved to limit positions.

The second grooves on the sliding blocks are gradually communicated with the first grooves during a duration from Step 2-1 to Step 2-2.

In Step 2-3, when the second grooves are completely communicated with the first grooves, the small products reach the weighing mechanism, and at the same time, gear levers are aligned with outlet directions of the weighing mechanism.

In Step 3, the small products are weighed, that is, the small products are weighed by the weighing mechanism.

In Step 4, with the rotation of the transferring wheel, the gear levers aligned with the outlet directions of the weighing mechanism are lifted, the small products located on the weighing mechanism are pushed into a discharging channel by side walls of the first channel located above the weighing mechanism.

In Step 5, weighing is continuously performed, that is, Step 1 to Step 4 are repeated recurrently.

Provided is further a weighing method based on a continuous weighing system for small products. The method includes the following steps.

In Step 1, small products are fed, that is, the plurality of small products are conveyed by a feeding mechanism into first grooves in a transferring wheel in a single row mode.

In Step 2, the small products are conveyed, that is, the plurality of small products are conveyed to a weighing mechanism one by one by a conveying and transferring mechanism.

In Step 2-1, with a rotation of the transferring wheel, one of the pushing rods reaching a second cam is moved upward along an opening direction of the second cam.

In Step 2-2, with the rotation of the transferring wheel, one of the pushing rods reaching a protrusion part of a second pushing portion is gradually moved to limit positions.

First channels are gradually communicated with the first grooves during a duration from Step 2-1 to Step 2-2.

In Step 2-3, when the first channels are completely communicated with the first grooves, the small products reach the weighing mechanism, and at the same time, gear levers are aligned with outlet directions of the weighing mechanism.

In Step 3, the small products are weighed, that is, the small products are weighed by the weighing mechanism.

In Step 4, with the rotation of the transferring wheel, the gear levers aligned with the outlet directions of the weighing mechanism are lifted, and the small products located on the weighing mechanism are pushed into a discharging channel by side walls of the first channel located above the weighing mechanism.

In Step 5, weighing is performed continuously, that is, Step 1 to Step 4 are repeated recurrently.

Based on the above technical solutions, the beneficial effects of the present disclosure lie in the following in comparison with the prior art.

1. The present disclosure provides a continuous conveying and transferring mode, which shortens the time for small products to go up and down the weighing platform, shortens the weighing cycle of each small product in the case of ensuring the same weighing time, greatly speeds up the weighing speed of small products, and realizes the high-speed weighing.

2. A conveying and transferring mechanism is used in the present disclosure, which prevents small products from being deformed due to squeeze during the whole conveying and transferring process, reduces the risk of damage or powder leakage of small products, and further adapts to the weighing of small products with a certain amount of deformation.

3. The small products, the conveying and transferring mechanism and the weighing mechanism of the present disclosure have good synchronization, the falling points on the weighing platform are neat, the weighing duration is consistent, the weighing mechanism is not affected by inertial force and friction force regardless of a high-speed weighing or a low-speed weighing, and the weighing mechanism has good stability, small interference and guaranteed accuracy.

4. A linkage follower mechanism is arranged at front of the weighing platform, and the gear levers are fallen down to block at the front of the small products when the small products slide onto the weighing platform, which can limit the positions of the small products on the weighing platform.

5. In the present disclosure, after the weighing is completed, the roller closely proximate to the cam block drives the gear lever to lift, which keeps the discharging in front of the small products unblocked, and the gear lever swings up and down once, every time the weighing of one small product is completed.

BRIEF DESCRIPTION OF THE DRAWINGS

The present disclosure is further described below in combination with the accompanying drawings and the embodiments.

Figure 1:
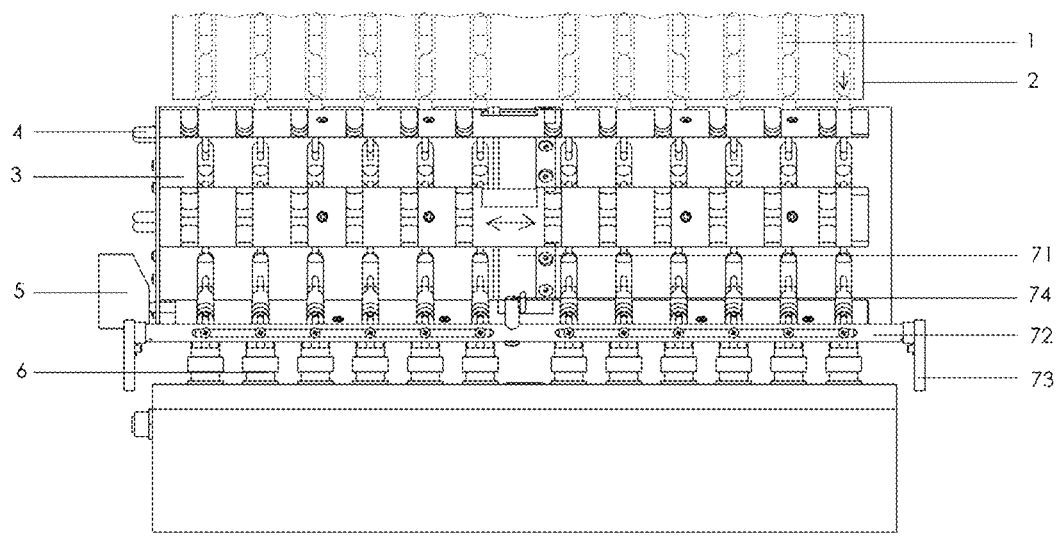
FIG. 1 illustrates a schematic diagram of an overall structure of the present disclosure.

In the drawings: 1. Small product; 2. Feeding mechanism; 3. Conveying and transferring mechanism; 31. Transferring wheel; 32. First channel; 33. Sliding block; 331. Second groove; 34. First groove; 341. Limiting portion; 342. First slope; 343. Second slope; 344. Channel section; 35. Guide base; 36. Gear level channel; 4. Pushing rod; 5. Pushing mechanism; 51. First cam; 52. First pushing portion; 53. Second cam; 54. Second pushing portion; 6. Weighing mechanism; 61. Weighing platform; 611. Positioning groove; 612. Table; 613. Base; 62. Weighing sensor; 71. Cam structure; 711. Cam block; 712. Cam groove; 72. Swinging shaft; 73. Fixation frame; 74. Roller; 75. Swing arm; 76. Gear lever; 8. Slide slot; 9. Discharging channel.

DETAILED DESCRIPTION OF THE EMBODIMENTS

The present disclosure will now be further described in detail with reference to the accompanying drawings. These drawings are all simplified schematic diagrams, which only illustrate the basic structure of the present disclosure in a schematic mode, so they only show the composition related to the present disclosure.

The present disclosure provides a continuous weighing system for small products. The weighing system is mounted on a support (the support is not illustrated in the accompanying drawings). The support is configured to fix and support the weighing system. As illustrated in FIG. 1 to FIG. 11, the weighing system comprises a feeding mechanism 2, a conveying and transferring mechanism 3, a plurality of pushing rods 4, a pushing mechanism 5, a plurality of resetting mechanisms, a weighing mechanism 6, a linkage follower mechanism and a discharging channel 9, wherein the small products 1 are capsules, capsule shaped tablets or other products in the similar shape. The conveying and transferring mechanism 3 includes a transferring wheel 31, a plurality of first channels 32, a plurality of sliding blocks 33, a plurality of first grooves 34 and a guide base 35. The weighing mechanism 6 includes a plurality of weighing platforms 61 and weighing sensor 62. The linkage follower mechanism includes a cam structure 71, a swing shaft 72, a fixation frame 73, a roller 74, a swing arm 75 and a plurality of gear levers 76.

As illustrated in FIG. 1, the feeding mechanism 2 is arranged at a top portion of the support, and the feeding mechanism 2 is configured to convey the plurality of small products 1 from an outlet of the feeding mechanism 2 into the conveying and transferring mechanism 3 in a single row mode, that is, the small products 1 are fallen into the conveying and transferring mechanism 3 in a vertical arrangement mode.

The conveying and transferring mechanism 3 is arranged below the feeding mechanism 2. The conveying and transferring mechanism 3 is configured to convey the plurality of small products 1 to the weighing mechanism 6 separately. The transferring wheel 31 in the conveying and transferring mechanism 3 is arranged below the feeding mechanism 2. The plurality of first channels 32 are axially arranged on an outer circumferential surface of the transferring wheel 31 at an equal interval along an axial direction (a number of the plurality of first channels 32 is the number of workstations of the weighing system). The sliding blocks 33 are arranged in the first channels 32. The plurality of first grooves 34 are arranged on the outer circumferential surface of the transferring wheel 31 between each two adjacent first channels 32 at an equal interval along an axial direction. The guide base 35 is closely proximate to a part of an outer circumferential surface of the transferring wheel 31. Wherein, the transferring wheel 31 is located directly below the outlet of the feeding mechanism 2, the transferring wheel 31 is permanently rotated in a direction towards the guide base 35. A rotation of the transferring wheel 31 is realized by a driving mechanism, and a servo motor can be adopted as the driving mechanism. When the outer circumferential surface of the transferring wheel 31 is rotated to be proximate to the guide base 35, accommodating cavities are formed between the first grooves 34 of the transferring wheel 31 and the guide base 35 to prevent the small products 1 from falling off.

Figure 11:
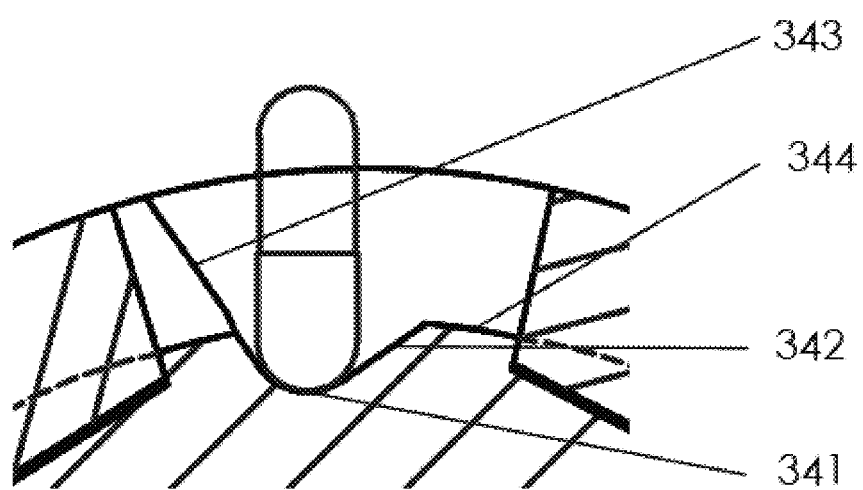
FIG. 11 illustrates a schematic diagram of a first groove of the present disclosure.

As illustrated in FIG. 11, each of the first grooves 34 includes a limiting portion 341, a first slope 342, a second slope 343 and a channel section 344. The channel section 344, the first slope 342, the limiting portion 341 and the second slope 343 are sequentially arranged on a bottom portion of each of the first grooves 34 along a rotation direction of the transferring wheel 31. A bottom surface of the channel section 344 is concentric with and equidistant from an outer circle of the transferring wheel 31. The limiting portion 341 is formed by concaving an intersection between the first slope 342 and the second slope 343 towards the bottom portion of the first groove 34. The first slope 342, the limiting portion 341 and the second slope 343 are in V-shaped structure. The first slope 342, the limiting portion 341 and the second slope 343 extend a falling space for the small products 1. The limiting portion 341 is located at a lowest point of the first groove 34, and the limiting portion 341 plays a limiting role for the small products 1. When the small product 1 in the feeding mechanism 2 is fallen into the first grooves 34, the small products 1 is vertically fallen to the limiting portion 341. One end of the small product 1 is in contact with the limiting portion 341, and the other end of the small product 1 protrudes from the notch of the first groove 34 (this is to prevent two or more small products 1 from entering the first groove 34 in the conveying transfer mechanism 3 at the same time, one end of the small product 1 protrudes from the notch of the first groove 34, which plays a certain role in controlling the feeding of the feeding mechanism 2). With a rotation of the transferring wheel 31, the small products 1 falls down towards the first slopes 342 in the first grooves 34, at this time, the first slopes 342 plays a positioning role for the fallen small products 1, which keeps the small products 1 be located in the first grooves 34 in an inclined state and a lower ends of the small products are close to the limiting portion 341. When the first grooves 34 having the small products 1 are moved below the transferring wheel 31, the small products 1 are directly fallen backward onto the guide base 35, and the small products 1 are in contact with the guide base 35 in a lying state, which is convenient for conveying the small products 1 to the weighing mechanism 6 for weighing. Wherein, the first slope 342, the limiting portion 341 and the second slope 343 are arranged in combination, which is convenient for the small products 1 to enter the first groove 34 from the feeding mechanism 2 in sequence by relying on a rotation of the transferring wheel 31 when the feeding mechanism 2 is not required to arrange a special feeding gate for opening and closing the feeding, thereby simplifying an overall structure of the feeding mechanism 2.

As illustrated in FIG. 1, the pushing rods 4 are arranged at one side ends of the sliding blocks 33 along an axial direction of the sliding blocks 33. The pushing mechanism 5 is arranged on one side of the transferring wheel 31. The pushing mechanism 5 and the pushing rods 4 are located at the same side of the transferring wheel 31. The pushing mechanism 5 is configured to push the sliding blocks 33 connected with the pushing rods 4 to slide along the first channels 32 in a direction away from the pushing mechanism 5.

Figure 6:
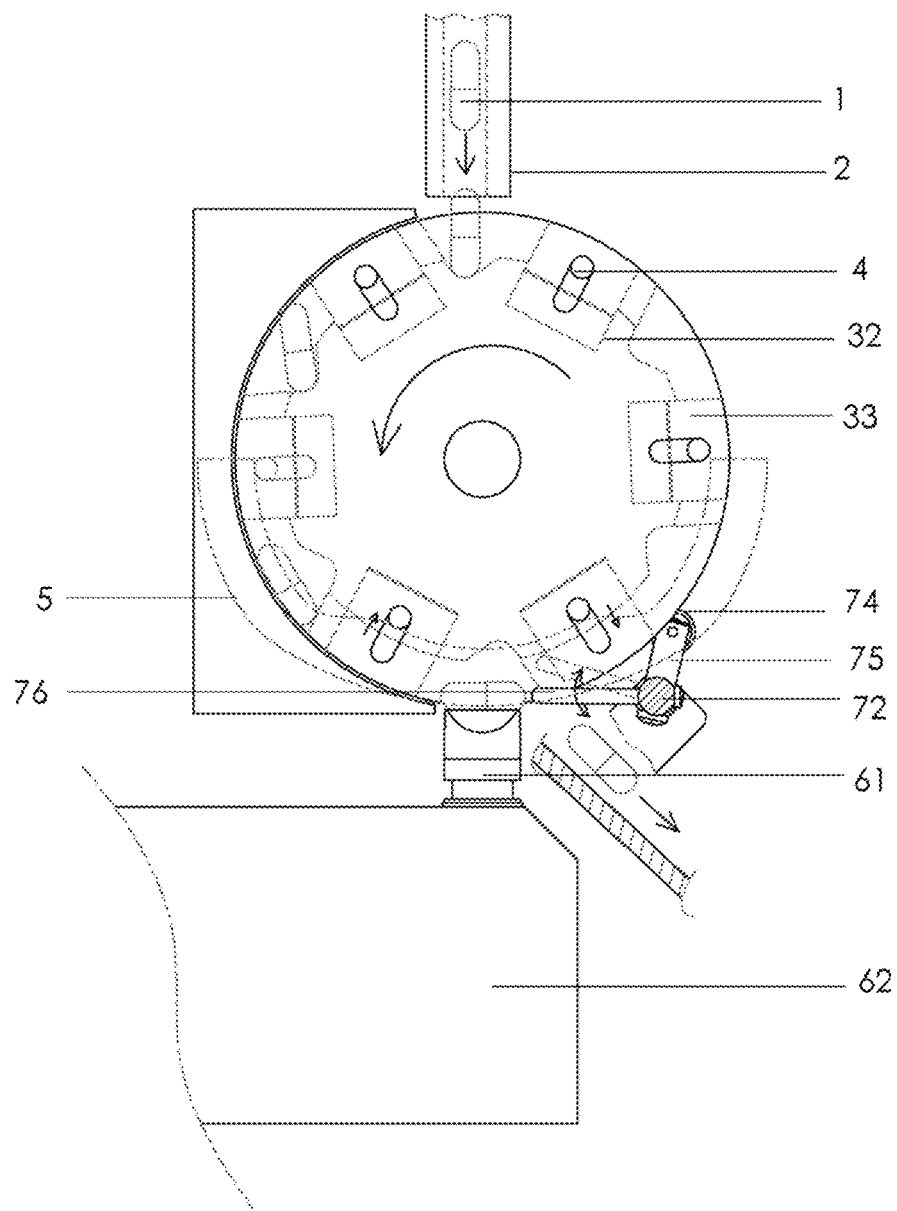
FIG. 6 illustrates a schematic diagram of an overall structure in Embodiment 2 of the present disclosure.
Figure 10:
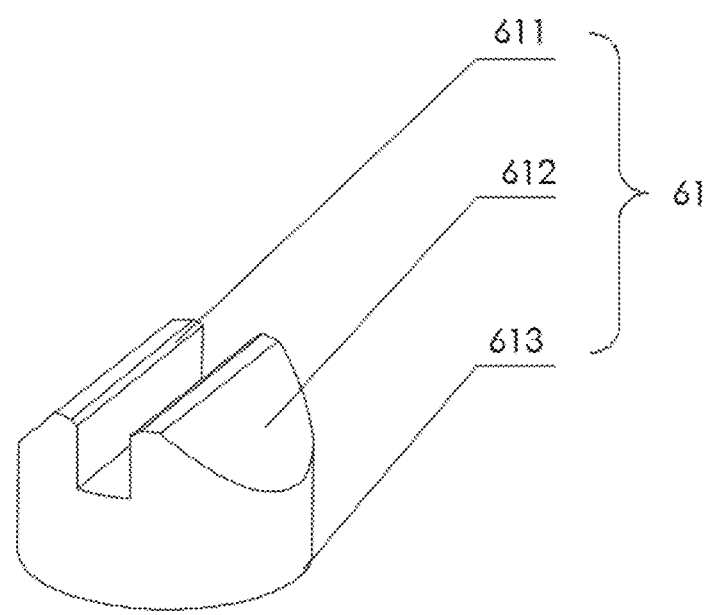
FIG. 10 illustrates a schematic diagram of an overall structure of a weighing platform of the present disclosure.

The weighing mechanism 6 is arranged below the transferring wheel 31 and is fixed on the support. The weighing mechanism 6 is configured to weigh the small products 1 one by one. As illustrated in FIG. 6, the weighing mechanism 6 includes a plurality of weighing platforms 61 and a weighing sensor 62. The plurality of weighing platforms 61 are arranged directly below the transferring wheels 31, and the weighing sensor 62 is arranged below the weighing platforms 61. As illustrated in FIG. 10, each of the weighing platforms 61 includes a positioning groove 611, tables 612, and a base 613. The base 613 is arranged above the weighing sensor 62, the positioning groove 611 is arranged above the base 613. A groove channel of the positioning groove 611 is coaxial with an outlet direction of the bottom portion of the transferring wheel 31. Both sides of a notch of the positioning groove 611 are tables 612. The tables 612 are inclined planes which prevent dust from accumulating on the tables 612. A radial groove width of the positioning groove 611 is smaller than an outer diameter of the small product 1, so as to support and position the small products 1. The discharging channel 9 is arranged below one side of the weighing mechanism 6 away from the guide base 35, and the discharging channel 9 is configured to transport the weighed small product 1.

The linkage follower mechanism is arranged above the discharging channel 9, and the linkage follower mechanism is configured to prevent the small products 1 from sliding from the weighing mechanism 6 to an external environment caused by a function of inertia. The linkage follower mechanism includes a cam structure 71, a swing shaft 72, a fixation frame 73, a roller 74, a swing arm 75 and a plurality of gear levers 76. The cam structure 71 is arranged along an outer circumferential surface of the transferring wheel 31 to form a circular structure. The swing shaft 72 is arranged above the discharge channel 9 along an axial direction of the transferring wheel 31. The fixation frame 73 is arranged on both sides of the discharging channel 9 and is connected to both ends of the swing shaft 72. The swing arm 75 is arranged above the swing shaft 72. The roller 74 is arranged on a top portion of the swing arm 75 and is tangent to a circular structure formed by the cam structure 71. The plurality of gear levers 76 are distributed at an equal interval on one side of the swinging shaft 72 facing the transferring wheel 31, and each of the gear levers 76 is aligned with one of the weighing platform 61.

Figure 2:
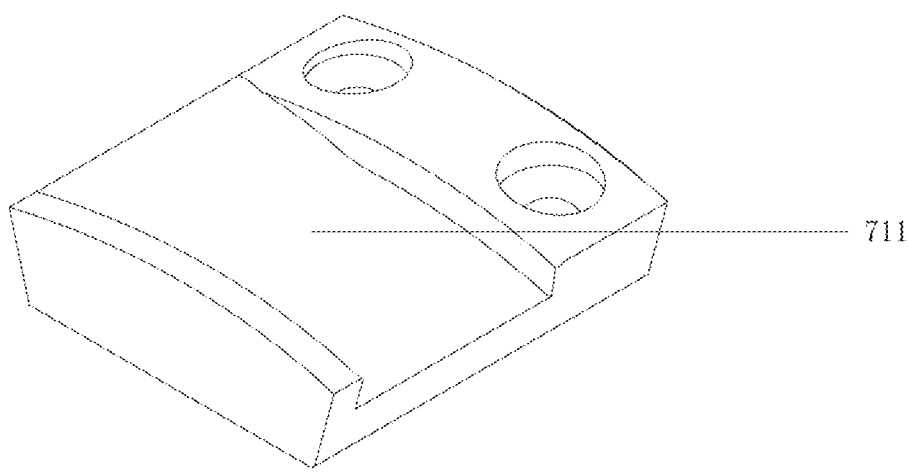
FIG. 2 illustrates a schematic diagram of a cam structure of the present disclosure.
Figure 7:
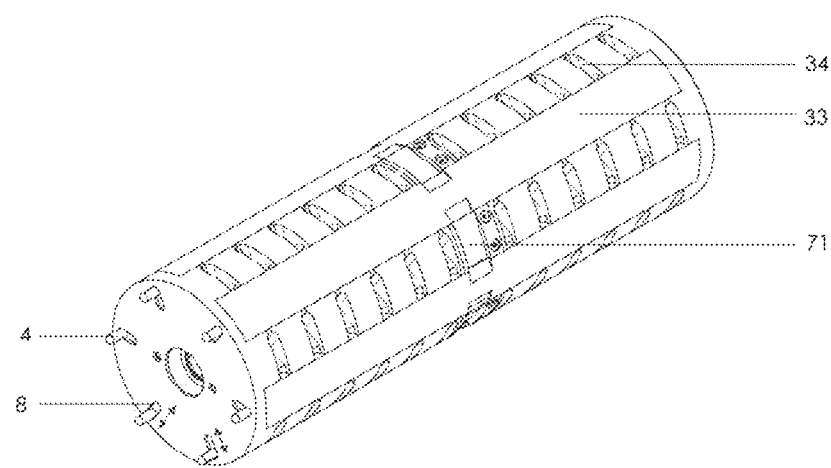
FIG. 7 illustrates a schematic diagram of a transferring wheel in Embodiment 2 of the present disclosure.
Figure 9:
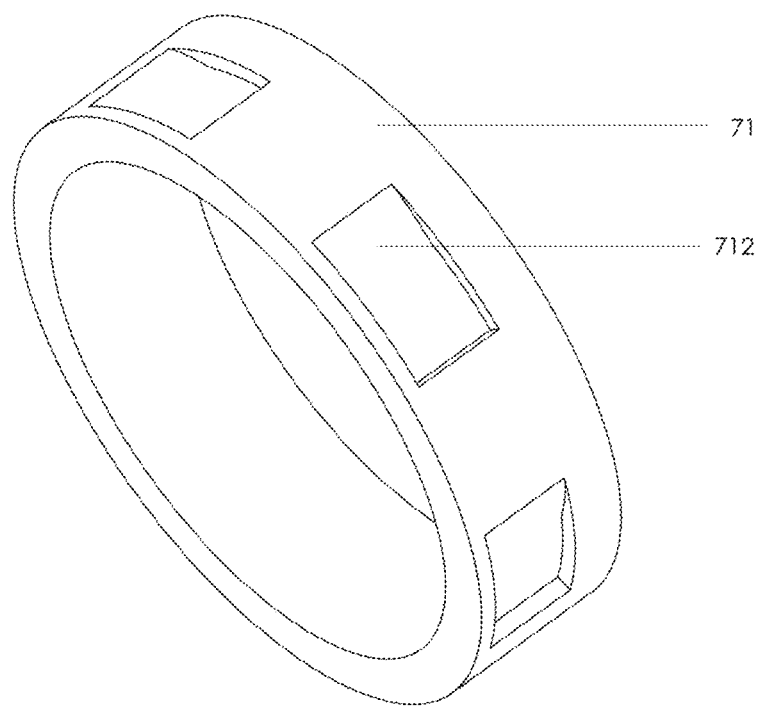
FIG. 9 illustrates a schematic diagram of another cam structure of the present disclosure.

The above-mentioned cam structure 71 has two forms. The first one is as follows. As illustrated in FIG. 2 and FIG. 7, the cam structure 71 is composed of a plurality of cam blocks 711. The plurality of cam blocks 711 are mounted on an outer circumferential surface of the transferring wheel 31 between each two adjacent first channels 32, and the plurality of the cam blocks 711 are arranged along the outer circumferential surface of the transferring wheel 31 to form a circular structure. The plurality of the cam blocks 711 are fixedly mounted on the transferring wheel 31 by bolt assemblies. One side of each of the cam blocks 711 facing the external environment is an arc-shaped surface, and one end of the arc-shaped surface in radial direction is higher, whereas the other end of the arc-shaped surface in radial direction is lower, and therefore, both ends are not in the same plane, which makes the roller 74 generate a radial displacement while rolling along the arc-shaped surface on the cam block 711, and the swing shaft 72 is driven to swing back and forth to make the gear lever 76 swing up and down at an outlet position of the weighing platform 61, which prevents the small products 1 from sliding out of the positioning groove 611 caused by a function of inertia, when the small products are fallen into the positioning groove 61 of the weighing platform 61 with the rotation of the transferring wheel 31. The second way is as follows. As illustrated in FIG. 9, a circular cam structure 71 provided with a plurality of cam grooves 712 is mounted at an arbitrary position on the outer circumferential surface of the transferring wheel 31, one side of each of the cam grooves 712 facing the external environment is an arc-shaped surface, and one end of the arc-shaped surface in radial direction is higher, whereas the other end of the arc-shaped surface in radial direction is lower, and therefore, both ends are not in the same plane. When the cam structure 71 is rotated along with the transferring wheel 31, the roller 74 generates a radial displacement while rolling along the arc-shaped surface on the cam groove 712, so that the swing shaft 71 is driven to swing back and forth, which makes the gear lever 76 swing up and down at the outlet position of the weighing platform 61.

Figure 4:
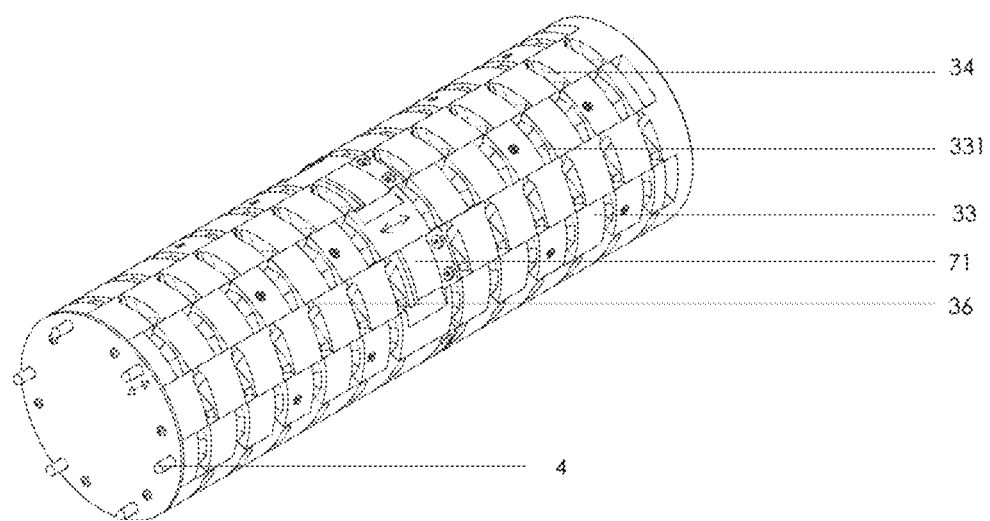
FIG. 4 illustrates a schematic diagram of a transferring wheel in Embodiment 1 of the present disclosure.

As illustrated in FIG. 4, the present disclosure further includes gear lever channels 36, the gear lever channels 36 are arranged on one sides of the first grooves 34 facing a rotation direction of the transferring wheel 31. The groove width of each of the gear lever channels 36 is less than a radial width of the small product 1. The first channels 32, the sliding blocks 33 and the pushing rods 4 are set to the same number that is the number of the workstations on the transferring wheel 31. The number of the first grooves 34 and the number of the gear lever channels 36 are respectively the number of groups at one workstation. Preferably, the number of the first channels 32 and the number of the workstations on the transferring wheel 31 are respectively six, the number of the first grooves 34 is twelve per group and with six groups in total.

Embodiment 1

Figure 3:
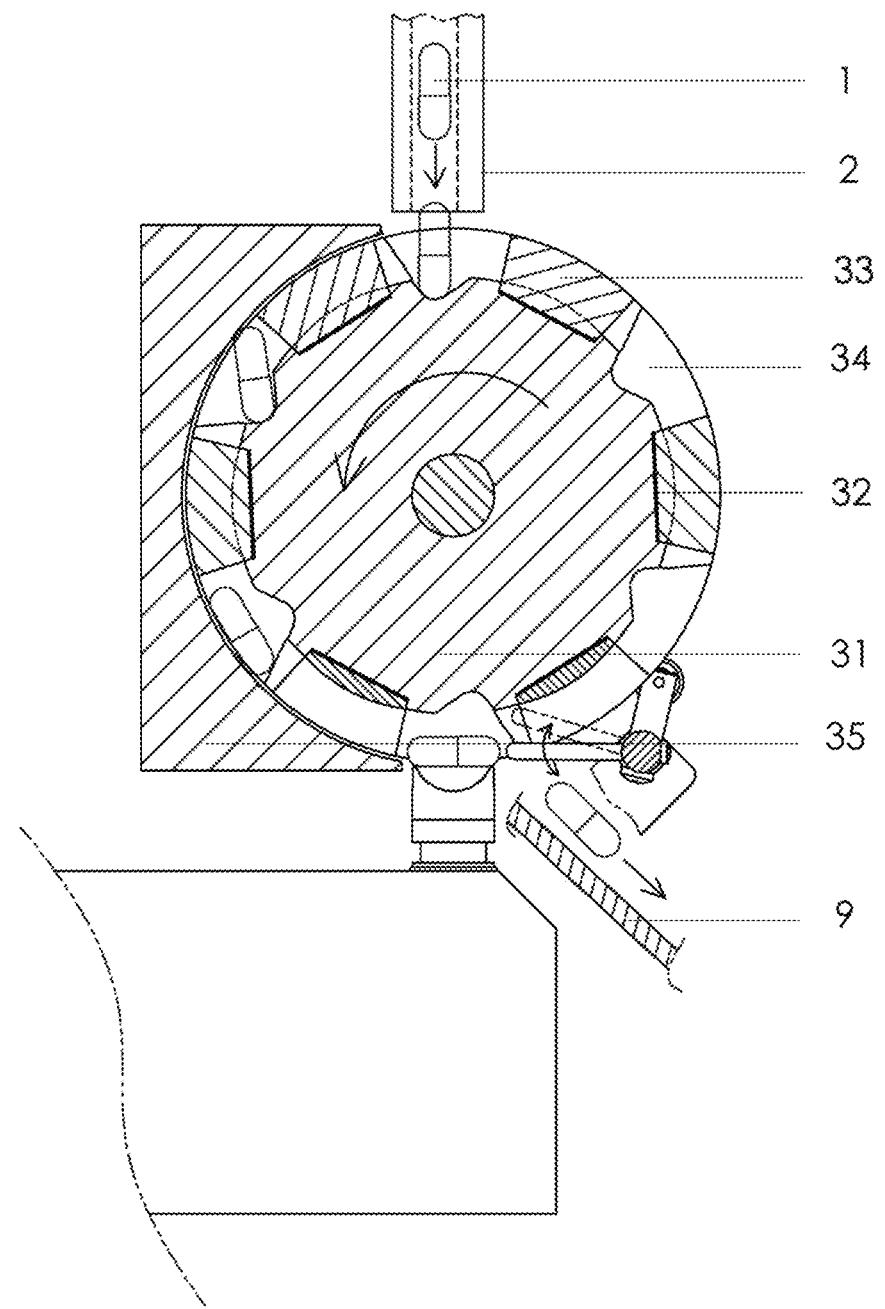
FIG. 3 illustrates a schematic diagram of an overall structure in Embodiment 1 of the present disclosure.
Figure 5:
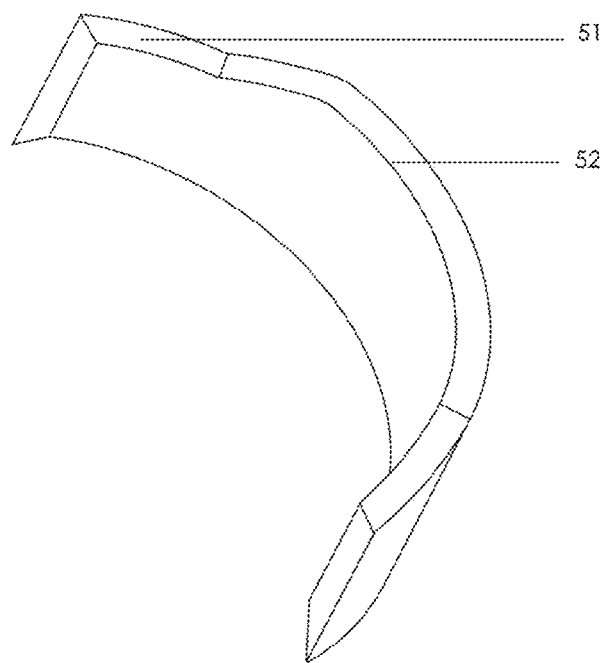
FIG. 5 illustrates a schematic diagram of a pushing mechanism in Embodiment 1 of the present disclosure.

A preferred implementation based on the above structure is provided in this embodiment. As illustrated in FIG. 3 to FIG. 5, in this implementation, the plurality of sliding blocks 33 are reciprocally slid along an axial direction of the first channels 32. An arbitrary mechanical structure that is capable of resetting the pushing rods 4 in the limit position to an initial position can be adopted as the resetting mechanism. Preferably, an elastic element can be adopted as the resetting mechanism, the elastic element is arranged on side wall of the first channel 32 away from the pushing rod 4, and the pushing rod 4 in the limit position is reset to the initial position by an elasticity of the elastic element. Preferably, the mechanical structure in combination of the elastic element and the guide rail can be adopted as the resetting mechanism. The guide rail is axially mounted along the first channel 31, the sliding block 33 in the first channel 32 is slid along the guide rail, the elastic element is mounted on the guide rail, and the pushing rod 4 in the limit position is reset to the initial position by the elasticity of the elastic element. As illustrated in FIG. 5, the pushing mechanism 5 includes a first cam 51 and a first pushing portion 52. The first cam 51 is in a semi-circular-shaped structure as a whole, an opening of the first cam 51 faces upwards, the pushing portion 52 is arranged on one side of the first cam 51 facing the transferring wheel 31 and extends towards the transferring wheel 52. A connection transition part between the first cam 51 and the first pushing portion 52 is an inclined plane, which is convenient for the pushing rods 4 to smoothly move from the first cam 51 to the first pushing portion 52, and the pushing rods 4 will not get stuck when the pushing rods 4 are squeezed by the first pushing portion 52. A distance between the fist cam 51 and the transferring wheel 31 is consistent with a length of the pushing rod 4.

As illustrated in FIG. 4, the embodiment further includes a plurality of second grooves 331, the plurality of the second grooves 331 are arranged at an equal interval on one side of the sliding blocks 33 facing the external environment. The distance between each two adjacent second grooves 331 is in consistent with the distance between each two adjacent first grooves 34. A length of each of the first channels 31 is greater than a length of each of the sliding blocks 33. A length difference between the first channel 32 and the sliding block 33 is consistent with an extending distance of the first pushing portion 52. When the first channel 32 is flush with one side of the sliding block 33 proximate to the pushing rod 4, the pushing rod 4 extends out of the first channel 32 completely. The groove widths of the first groove 34 and the second groove 331 are both larger than the radial widths of the small products 1.

That is to say, when the sliding blocks 33 are rotated below the transferring wheel 31 along with the transferring wheel 31, the pushing rods 4 reaching the first cam 51 moves along one side of the first cam 51 toward the transferring wheel 31, when the pushing rods 4 are moved to the first pushing portion 52, the pushing rods 4 is squeezed by the first pushing portion 52 in the direction of the transferring wheel 31, so that the pushing rod 4 moves axially toward the transferring wheel 31, thereby driving the sliding blocks 33 to move in a direction away from the pushing rods 4 to a limit position in the first channel.

In this embodiment, the initial position of the pushing rod 4 is that the pushing rod 4 completely extends out of the transferring wheel 31. The limit position of the pushing rod 4 in this embodiment is as follows. The pushing rod 4 is partially located in the first channel 32, and one end of the sliding block 33 away from the pushing rod 4 is in contact with one end portion of the first channel 32 away from the pushing rod 4. In the process that the pushing rod 4 is moved towards one side of the transferring wheel 31 along the first pushing portion 52, the plurality of second grooves 331 on the sliding block 33 connected to the pushing rod 4 are gradually communicated with the first groove 34 adjacent to the sliding block 33 and located above the weighing platform 61. The second grooves 331 of the sliding block 33 are completely communicated with the first grooves 34 adjacent to the sliding blocks and moving above the weighing platform 61, only when the small products 1 in the first grooves 34 is moved along the guide base 35 to the positioning groove 611 on an upper portion of the weighing platform 61.

As illustrated in FIG. 3, the direction described below is consistent with the figure. When the small product 1 is located at the weighing platforms 61: the plurality of second grooves located on left and right sides of the small product 1 is completely communicated with the plurality of first grooves 34 located above the small product 1, with a rotation of the transferring wheel 31, the second grooves 331 and the first grooves 34 that are communicated with each other can completely avoid touching the small product 1 on the weighing platforms 61. With a rotation of transferring wheel 31, the small product 1 on the weighing platform 61 is pushed to the discharging channel 9 by the gear lever channel 36 on the first channel 32 at a left side of the small product 1. And at the same time, the gear lever 76 is driven by the roller 74 to align with the outlet of the positioning groove 611, which prevents the small product 1 sliding to the positioning groove 611 from falling off. With a rotation of the transferring wheel 31, the gear lever 76 on the linkage follower mechanism is swung up and down, the gear lever channel 36 not only reserves a space which is convenient for swing of the gear lever 76, but also can drive the small product 1 to slide into the discharging channel 9.

This embodiment further includes a weighing method for the continuous weighing system for small products, and the specific steps are as follows.

In Step 1, small products are fed, that is, the plurality of small products 1 are conveyed by a feeding mechanism 2 into first grooves 34 in a transferring wheel 31 in a single row mode.

In Step 2, the small products are conveyed, that is, the plurality of the small products 1 are conveyed to a weighing mechanism 6 one by one by a conveying and transferring mechanism 3.

In Step 2-1, with a rotation of the transferring wheel 31, one of the pushing rods 4 reaching a first cam 51 is moved along one side of the first cam 51 facing the transferring wheel 31.

In Step 2-2, with the rotation of the transferring wheel 31, one of the pushing rods 4 reaching a first pushing portion 52 is gradually moved to limit positions.

Wherein second grooves 331 on the sliding blocks 33 reaching the first pushing portion 52 are gradually communicated with the first grooves 34, during a duration from Step 2-1 to Step 2-2.

In Step 2-3, when the second grooves 331 are completely communicated with the first grooves 34, the small products 1 reach the positioning grooves 611 on the weighing platforms 61 and at the same time, gear levers 76 are aligned with outlet directions of the weighing platforms 61.

In Step 3, the small products are weighed, that is, the small products 1 are weighed by the weighing mechanism 6.

In Step 4, with the rotation of the transferring wheel 31, the gear levers 76 aligned with outlet directions of the weighing platforms 61 are lifted, the small products 1 located on the positioning groove 611 are pushed into a discharging channel 9 by side walls of first channels 32 located above the weighing platforms 61.

In Step 5, weighing is continuously performed, that is, Step 1 to Step 4 are repeated recurrently.

Embodiment 2

Figure 8:
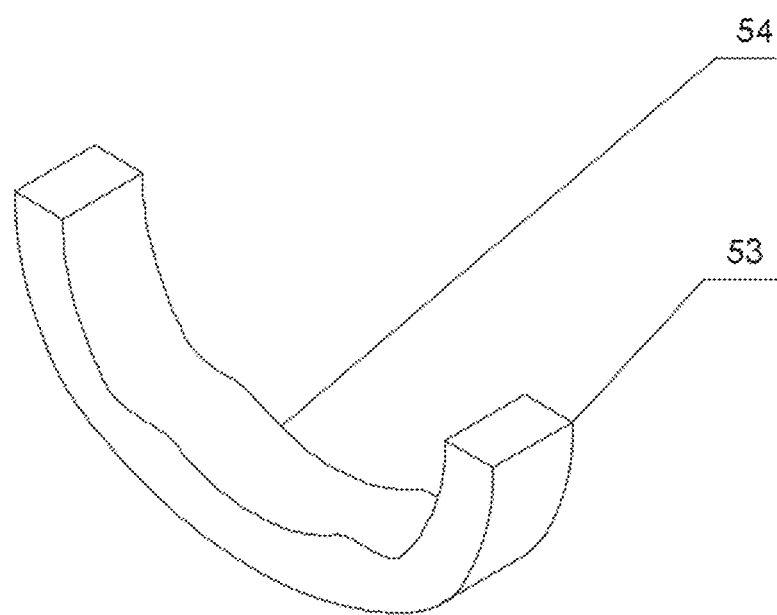
FIG. 8 illustrates a schematic diagram of a pushing mechanism in Embodiment 2 of the present disclosure.

A preferred embodiment based on the above structure is provided in this embodiment. As illustrated in FIG. 6 to FIG. 8, in this embodiment, a plurality of slide slots 8 facing a circle center of an end face are arranged along a circumference of the end face on the end face at a same side of the transferring wheel 31 and the pushing rod 4. A plurality of sliding blocks 33 are reciprocally moved along an radial direction of the first channel 12. An arbitrary mechanical structure that is capable of resetting the pushing rods 4 in the limit position to an initial position can be adopted as the resetting mechanism. Preferably, an elastic element can be adopted as the resetting mechanism, the elastic element is arranged at a bottom portion of the first channel 32 and is in contact with the sliding block 33 in the first channel 12, and the pushing rod 4 in the limit position is reset to the initial position by an elasticity of the elastic element. As illustrated in FIG. 8, the second cam 53 is in a semi-circular-shaped structure as a whole, an opening of the second cam 53 faces upwards, the second pushing portion 54 is arranged on an opening face of the second cam 53, and the second pushing portion 54 is a wavy structure. A height of a protrusion part of the second pushing portion 54 is consistent with a length of the slide slot 8.

In this embodiment, the initial position of the pushing rod 4 is that: one surface of the sliding block 33 facing the external environment is connected with the circumferential surface of the transferring wheel 31. The limit position of the pushing rod 4 in this embodiment is that: the pushing rod 4 is slid to a top portion of the protrusion part of the second pushing portion 54 to drive the sliding block 33 connected to the pushing rod 4 to lift upward, and at the same time, the first channel 32 where the sliding block 33 located is in communication with the first groove 34 adjacent to the sliding block 33 located above the weighing platform 61.

That is to say, when the sliding block 33 is rotated below the transferring wheel 31 along with the transferring wheel 31, the pushing rod 4 reaching the second cam 53 is erected on the opening face of the second cam 53, and when the pushing rod 4 is moved to the protrusion part of the second pushing portion 54, the pushing rod 4 is squeezed by the second pushing portion 54 upward to drive the pushing rod 4 to move upward, thereby driving the sliding block 33 to move radially along the slide slot 8 to a center of the transferring wheel 31 in the first channel 32 until to the limit position, at this time, the first channel 32 where the sliding block 33 located is in communication with the first groove 34 adjacent to the sliding block 33 located above the weighing platform 61.

As illustrated in FIG. 6, the direction described below is consistent with the figure, the small products 1 are conveyed from the first grooves 34 to the positioning grooves 611 at the weighing platform 61. When the small products 1 are in the weighing state: the sliding blocks 33 in the two first channels 32 below the transferring wheel 31 are in the limit positions, and the first grooves 34 directly above the weighing platform 61 are in communication with the first channels 32 at the left sides of the first grooves 34, and at the same time, the gear levers 76 driven by the roller 74 are aligned with the outlets of the positioning grooves 611, which prevents the small products 1 sliding to the positioning groove 611 from falling off. The transferring wheel 31 is continuously rotated, the sliding block 33 at the left side of the first groove 34 directly above the weighing platform 61 dangles over the small product 1 on the positioning groove 611, and at this time, the small product 1 is stationary on the weighing platform 61 for weighing. After the small product 1 is weighed, the roller 74 drives the gear lever 76 to lift to expose an outlet of positioning groove 611. Then, the gear lever channel 36 on the first channel 32 at the left side of the small product 1 on the weighing platform 61 pushes away the small product 1 at the weighing platform 61, and sends the small product 1 into the discharging channel 9.

This embodiment further includes a weighing method for a continuous weighing system for small product, and the specific steps are as follows.

In Step 1, small products are fed, that is, the plurality of small products 1 are conveyed by a feeding mechanism 2 into first grooves 34 in a transferring wheel 31 in a single row mode.

In Step 2, the small products are conveyed, that is, the plurality of the small products 1 are conveyed to a weighing mechanism 6 one by one by a conveying and transferring mechanism 3.

In Step 2-1, with a rotation of the transferring wheel 31, one of the pushing rods 4 reaching a second cam 53 is moved upward along an opening direction of the second cam 53.

In Step 2-2, with the rotation of the transferring wheel 31, one of the pushing rods 4 reaching a protrusion part of a second pushing portion 54 is gradually moved to limit positions.

Wherein the first channels 32 are gradually communicated with the first grooves 34 during a duration from Step 2-1 to Step 2-2.

In Step 2-3, when the first channels 32 are completely communicated with the first grooves 34, the small products 1 reach the positioning grooves 611 on the weighing platforms 61, and at the same time, gear levers 76 are aligned with outlet directions of the weighing platforms 61.

In Step 3, the small products are weighed, that is, the small products 1 are weighed by the weighing mechanism 6.

In Step 4, with the rotation of the transferring wheel 31, the gear levers 76 aligned with the outlet directions of the weighing platforms 61 are lifted, and the small products 1 located on the positioning groove 611 are pushed into a discharging channel 9 by side walls of first channels 32 located above the weighing platform 61.

In Step 5, weighing is continuously performed, that is, Step 1 to Step 4 are repeated recurrently.

This embodiment provides a continuous conveying and transferring mode, which shortens the time for small products 1 to go up and down the weighing platform 61, shortens the weighing cycle of each small product 1 in the case of ensuring the same weighing time, greatly speeds up the weighing speed of the small products 1 and achieves the high-speed weighing.

Those skilled in the art should understand that, unless otherwise defined, all terms (including technical and scientific terms) used herein have the same meaning as commonly understood by those of ordinary skill in the art to which the present disclosure belongs. It should also be understood that those terms, such as those defined in a general dictionary, should be understood to have a meaning that is consistent with the meaning in the context of the prior art and will not be interpreted in an idealized or overly formal sense unless otherwise defined herein.

The meaning of "and/or" in the present disclosure refers to the situations that exist separately or both exist at the same time.

The meaning of "connection" in the present disclosure may be that a direct connection between components or an indirect connection between components by means of other components.

Inspired by the above ideal embodiments according to the present disclosure, through the above description, relevant workers can make various changes and modifications without departing from the scope of the technical idea of the present disclosure. The technical scope of the present disclosure is not limited to the contents on the description, and must be determined according to the scope of the claims.

What is claimed is:

1. A continuous weighing system for small products, comprising a support, wherein the system comprises a feeding mechanism, a conveying and transferring mechanism, a plurality of pushing rods, a pushing mechanism, a plurality of resetting mechanisms, a weighing mechanism, a discharging channel and a linkage follower mechanism, wherein, the feeding mechanism is arranged at a top portion of a support, and the feeding mechanism is configured to convey the plurality of small products to the conveying and transferring mechanism in a single row mode;

the conveying and transferring mechanism is arranged below the feeding mechanism, and the conveying and transferring mechanism is configured to convey the plurality of small products to the weighing mechanism one by one;

the conveying and transferring mechanism includes a transferring wheel, a plurality of first channels, a plurality of sliding blocks, a plurality of first grooves and a guide base, the transferring wheel is arranged below the feeding mechanism, the plurality of first channels are arranged on an outer circumferential surface of the transferring wheel at an equal interval along an axial direction, the sliding blocks are arranged inside the first channels, the plurality of first grooves are arranged on the outer circumferential surface of the transferring wheel between each two adjacent first channels at an equal interval along an axial direction, the guide base is closely proximate to a part of the outer circumferential surface of the transferring wheel;

each of the pushing rod is arranged at one end of a respective one of the sliding blocks along an axial direction of the respective one of the sliding blocks;

the pushing mechanism is arranged on one side of the transferring wheel, and the pushing mechanism and the pushing rods are located at a same side of the transferring wheel, and the pushing mechanism is configured to push the sliding blocks connected with the pushing rods to slide along the first channels in a direction away from the pushing mechanism;

the resetting mechanisms are configured to push the sliding blocks connected with the pushing rods to slide along the first channels towards an initial position;

the weighing mechanism is arranged below the transferring wheel and fixed on the support, and the weighing mechanism is configured to weigh the small products one by one;

the discharging channel is arranged below one side of the weighing mechanism away from the guide base, and the discharging channel is configured to discharge the weighed small products; and the linkage follower mechanism is arranged above the discharging channel, and the linkage follower mechanism is configured to prevent the small products from slipping from the weighing mechanism to an external environment caused by a function of inertia.

2. The continuous weighing system for small products according to claim 1, wherein, each of the first grooves includes a limiting portion, a first slope, a second slope and a channel section, the channel section, the first slope, the limiting portion and the second slope are sequentially arranged at a bottom portion of each of the first grooves along a rotation direction of the transferring wheel, the limiting portion is formed by concaving an intersection of the first slope and the second slope along a direction of a middle portion of the transferring wheel, the first slope, the limiting portion and the second slope are in a V-shaped structure, and a bottom surface of the channel section is concentric with and equidistant from an outer circle of the transferring wheel.

3. The continuous weighing system for small products according to claim 2, wherein, the linkage follower mechanism includes a cam structure, a swing shaft, a fixation frame, a roller, a swing arm and a plurality of gear levers, the cam structure is arranged along an outer circumferential surface of the transferring wheel to form a circular structure, the swing shaft is arranged above the discharging channel along an axial direction of the transferring wheel, the fixation frame is arranged on both sides of the discharging channel and is connected to both ends of the swing shaft, the swing arm is arranged above the swing shaft, the roller is arranged at a top portion of the swing arm and is tangent to the circular structure formed by the cam structure, the plurality of gear levers are distributed at an equal interval on one side of the swing shaft facing the transferring wheel, and each gear lever is aligned with an outlet direction of the weighing mechanism, respectively.

4. The continuous weighing system for small products according to claim 3, wherein, the plurality of sliding blocks are reciprocally slid along an axial direction of the first channels.

5. The continuous weighing system for small products according to claim 3, wherein, the plurality of sliding blocks are reciprocally slid along an radial direction of the first channels.

6. The continuous weighing system for small products according to claim 4, wherein, the system further includes a plurality of second grooves, and the plurality of second grooves are arranged at an equal interval on one side of the sliding blocks facing external environment, a distance between each two adjacent second grooves is consistent with a distance between each two adjacent first grooves.

7. The continuous weighing system for small products according to claim 6, wherein, the pushing mechanism includes a first cam and a first pushing portion, the first pushing portion is formed by a part of the first cam extending in a direction of the transferring wheel from one side facing the transferring wheel.

8. The continuous weighing system for small products according to claim 5, wherein, the pushing mechanism includes a second cam and a second pushing portion, the second pushing portion is formed by a part protruding upward from a top surface of the second cam.

9. A weighing method based on the continuous weighing system for small products according to claim 7, wherein the method includes following steps:
   Step 1, feeding small products: conveying, by a feeding mechanism, the plurality of small products into first grooves in a transferring wheel in a single row mode;
   Step 2, conveying the small products: conveying, by a conveying and transferring mechanism, the plurality of small products to a weighing mechanism one by one;
   Step 2-1, moving, with a rotation of the transferring wheel, one of the pushing rods reaching a first cam along one side of the first cam facing the transferring wheel;
   Step 2-2, gradually moving, with the rotation of the transferring wheel, one of the pushing rods reaching a first pushing portion to limit a position,
   wherein, the second grooves on the sliding blocks are gradually communicated with the first grooves during a duration from Step 2-1 to Step 2-2;
   Step 2-3, enabling, when the second grooves are completely communicated with the first grooves, the small products to reach the weighing mechanism meanwhile aligning gear levers with outlet directions of the weighing mechanism;
   Step 3, weighing the small products: weighing, by the weighing mechanism, the small products;
   Step 4, lifting, with the rotation of the transferring wheel, the gear levers aligned with the outlet directions of the weighing mechanism; pushing, by side walls of the first channel located above the weighing mechanism, the small products located on the weighing mechanism into a discharging channel; and
   Step 5, continuously weighing: repeating Step 1 to Step 4 recurrently.

10. A weighing method based on a continuous weighing system for small products according to claim 8, wherein, the method includes following steps:
   Step 1, feeding small products: feeding, by a feeding mechanism, the plurality of small products into first grooves in a transferring wheel in a single row mode;
   Step 2, conveying the small products: conveying, by a conveying and transferring mechanism, the plurality of small products to a weighing mechanism one by one;
   Step 2-1, moving, with a rotation of the transferring wheel, one of pushing rods reaching a second cam upward along an opening direction of the second cam;
   Step 2-2, gradually moving, with the rotation of the transferring wheel, one of the pushing rods reaching a protrusion part of a second pushing portion to limit positions, wherein first channels are gradually communicated with the first grooves during a duration from Step 2-1 to Step 2-2;
   Step 2-3, enabling, when the first channels are completely communicated with the first grooves, the small products to reach the weighing mechanism, meanwhile aligning gear levers with outlet directions of the weighing mechanism;
   Step 3, weighing the small products: weighing, by the weighing mechanism, the small products;
   Step 4, lifting, with the rotation of the transferring wheel, the gear levers aligned with the outlet directions of the weighing mechanism; pushing, by side walls of the first channel located above the weighing mechanism, the small products located on the weighing mechanism into a discharging channel; and
   Step 5, continuously weighing: repeating Step 1 to Step 4 recurrently.

\* \* \* \* \*